United States Patent [19]

Nakanishi et al.

[11] Patent Number: 4,530,068
[45] Date of Patent: Jul. 16, 1985

[54] ELECTRONIC HAND-HELD MEMORY DEVICE

[75] Inventors: Yasuhiro Nakanishi; Yoshiyuki Fujikawa, both of Nara, Japan

[73] Assignee: Sharp Kabushiki Kaisha, Osaka, Japan

[21] Appl. No.: 273,103

[22] Filed: Jun. 12, 1981

[30] Foreign Application Priority Data

Jun. 13, 1980 [JP] Japan .................. 55-80348

[51] Int. Cl.³ .................. G06F 15/02; G06F 15/40
[52] U.S. Cl. .................. 364/900; 364/705; 364/706; 368/10; 368/251
[58] Field of Search ... 364/200 MS File, 900 MS File, 364/706, 705, 401–408, 709; 340/707, 711, 712, 825.26, 825.27; 368/10, 28, 41, 251

[56] References Cited

U.S. PATENT DOCUMENTS

| | | | |
|---|---|---|---|
| 3,942,157 | 3/1976 | Azure | 364/900 |
| 4,016,542 | 4/1977 | Azure | 364/900 |
| 4,070,649 | 1/1978 | Wright, Jr. et al. | 340/146.3 SY |
| 4,115,870 | 9/1978 | Lowell | 364/900 |
| 4,169,290 | 9/1979 | Reed et al. | 364/900 |
| 4,192,006 | 3/1980 | Hausdorff | 364/715 |
| 4,274,146 | 6/1981 | Yanagawa | 364/705 |
| 4,276,541 | 6/1981 | Inoue et al. | 340/146.3 SY |
| 4,277,837 | 7/1981 | Stuckert | 364/900 |
| 4,279,022 | 7/1981 | Abe | 364/900 |
| 4,321,674 | 3/1982 | Krames et al. | 364/413 |
| 4,352,161 | 9/1982 | Hirano et al. | 364/706 |
| 4,354,260 | 10/1982 | Planzo | 368/10 |
| 4,365,314 | 12/1982 | Badagnani et al. | 364/900 |
| 4,402,056 | 8/1983 | Sado et al. | 364/705 |
| 4,459,036 | 7/1984 | Sado et al. | 368/251 |

OTHER PUBLICATIONS

H. P. Hubbard, "Personal Computer", IBM Technical Disclosure Bulletin (vol. 19, No. 7), Dec. 1976, pp. 2419-2423.

Primary Examiner—Raulfe B. Zache
Assistant Examiner—Archie E. Williams, Jr.
Attorney, Agent, or Firm—Birch, Stewart, Kolasch & Birch

[57] ABSTRACT

An electronic hand-held memory device is capable of containing character information and numerical information stored together as a pair. Either or both types of information may be outputted, and the numerical information may be used for calculation. Loading and fetching of character information and numeral information are performed upon actuation of keys. The desired key in effect acts as a memory key during a numeral information mode. The desired key may serve as a constant memory key or a memory total key. When printing an output is desirable, the beginning of the character information is aligned with the most significant digit position and the end of the numeral information is aligned with the least significant digit position of a printer.

3 Claims, 12 Drawing Figures

| address | content |
|---|---|
| 0 | LABEL |
| 1 | A |
| 2 | T |
| 3 | O |
| 4 | T |
| 5 | A |
| 6 | L |
| 7 | DATA |
| 8 | 1 |
| 9 | 2 |
| 10 | 3 |
| 11 | 4 |
| 12 | 5 |
| 13 | 6 |
| 14 | END |
| 15 | LABEL |
| 16 | B |
| 17 | B |
| 18 | A |
| 19 | L |
| 20 | A |
| 21 | N |
| 22 | C |
| 23 | E |
| 24 | DATA |
| 25 | 9 |
| 26 | 8 |
| 27 | 7 |
| 28 | 6 |
| 29 | 5 |
| 30 | 4 |
| 31 | END |
| 32 | |

FIG. 3(3)

| label | character | numeral |
|---|---|---|
| A | TOTAL | 123456. |
| B | BALANCE | 987654. |

FIG. 3(1)

[LABEL] [A] [START] [T] [O] [T] [A]
[L] [DATA] [1] [2] [3] [4] [5] [6]
[END] [LABEL] [B] [START] [B]
[A] [L] [A] [N] [C] [E] [DATA] [9]
[8] [7] [6] [5] [4] [END]

FIG. 3(2)

⟨TYPE mode⟩

| Key actuations | display | print (legend) |
|---|---|---|
| CL | — | |
| LA W ST E L | EL —    M | |
| 9 9 9 | EL 999    M | |
| DT | 0 M | |
| Z 4 . 9 5 | 24.95 M | |
| ED | 24.95 | |
| LA S ST S A | SA —    M | |
| L E S | SALES —    M | |
| DT | 0 M | |
| ED | 0. | |
| ⟨to comp mode⟩ | | |
| | 0. | |
| LA W | EL 999ᵖ    — | |
| X | (BUSY) | EL 999    24.95 X |
| | 24.95 | |
| 9 | 9. | |
| = | (BUSY) | 9.— |
| | 224.55 | 224.55 X |
| Σ | " | (SP) |
| S | (BUSY) | 224.55 ΣS |
| | 224.55 | (SP) |
| LA S | SALESᵖ    — | |
| PRINT | (BUSY) | SALES    224.55 |
| | SALESᵖ    — | |

FIG. 4

(5/4, TAB=2)  <COMP mode>

| Key actuations | display | print |
|---|---|---|
| [LA][H] | EL-1190ᴰ → | |
| [X] | (BUSY) | EL-1190    154.95 X |
| | 154.95 | |
| [LA][D] | 83.55 | |
| [%] | (BUSY) | 83.55 % |
| | 129.46 | 129.46 X |
| | " | (SP) |
| [5][0] [X] | (BUSY) | 50. X |
| | 50. | |
| [LA][D] | 83.55 | |
| [%] | | 83.55 % |
| | (BUSY) | 41.78 X |
| | 41.78 | (SP) |

(5/4 . TAB=2)   <COMP mode>

| Key actuations | display | print |
|---|---|---|
| LA T | DE −6850 ᴰ → | |
| + | (BUSY) | DE−6850   89.50 + |
| | 89.50 | |
| LA Y | EF− 6806 ᴰ → | |
| + | (BUSY) | EF−6806   149.50+ |
| | 239.00 | |
| LA U | HN −5532 ᴰ → | |
| = | (BUSY) | HN−5532   49.95 = |
| | + | |
| | | 288.95 ✗   (SP) |
| | 288.95 | |
| Σ S | (BUSY) | 288.95 ΣS   (SP) |
| | 288.95 | |
| LA U | HN − 5532 ᴰ → | |
| X | (BUSY) | HN− 5532   49.95 X |
| | 49.95 | |
| 6 | 6. | |
| = | (BUSY) | 6.= |
| | " | 299.70 ✗   (SP) |
| | 299.70 | |
| Σ S | (BUSY) | 299.70 ΣS   (SP) |
| | 299.70 | |
| LA S | SALES ᴰ → | |
| PPINT | | SALES   588.65 |
| | 588.65 | |

SALES      588.65
```

FIG. 6(2)

| Key actuations | (5/4, TAB) display | ⟨COMP mode⟩ print | |
|---|---|---|---|
| LA D | 10 -10 -81 | | |
| PRINT | (BUSY) | 10-10-81 | |
| | 10-10-81 | | |
| 1 0 5 5 | 1055. | | |
| + | (BUSY) | 10.55 + | |
| | 10.55 | | |
| 4 3 3 0 | 4330. | | |
| + | (BUSY) | 43.30 + | |
| | 53.85 | | |
| 8 6 0 | 860. | | |
| = | (BUSY) | 8.60 = | |
| | " | 62.45 ✽ | |
| | 62.45 | | (SP) |
| X | (BUSY) | 62.45 X | |
| | 62.45 | | |
| LA T | TAX ᴰ  — | | |
| = | (BUSY) | TAX | |
| | " | 0.1 = | |
| | " | 6.25 ✽ | |
| | 6.25 | | (SP) |
| LA D  PRINT | (BUSY) | 10-10-81 | |
| | 10-10-81 | | |
| 5 3 . 2 5 | 53.25 | | |
| X | (BUSY) | 53.25 X | |
| LA T | TAX ᴰ  — | | |
| = | (BUSY) | TAX | |
| | ʼ | 0.1 = | |
| | ʼ | 5.33 ✽ | |
| | 5.33 | | (SP) |

FIG. 7

ELECTRONIC HAND-HELD MEMORY DEVICE

BACKGROUND OF THE INVENTION

This invention relates to an electronic hand-held memory apparatus capable of containing character information or numeral information stored together and, if necessary, outputting either or both types of said information and calculating with the numeral information.

A hand-held memory device exists which is capable of storing character information and numeral information stored together. This type of memory device is however inconvenient to use for the calculation of the numeral information. For example, this memory device is unable to recall two pieces of numeral information both stored therein for calculation and load the results of this calculation therein as the contents of the memory device.

OBJECTS AND SUMMARY OF THE INVENTION

With the foregoing in mind, it is an object of the present invention to provide an electronic hand-held memory device wherein loading and fetching character information and numeral information are performed upon actuation of a desired one of said keys, said desired key acting in effect as a memory key during a numeral information calculation mode.

According to an aspect of the present invention, there is provided an electronic hand-held memory device capable of containing character information and numeral information stored together and, if necessary, outputting either or both types of information and using the numeral information for calculation, wherein loading and fetching character information and numeral information are performed upon actuation of a desired one of keys, said desired key being in effect as a memory key during numeral information calculation mode. The above mentioned desired key may serve as a constant memory key or a memory total key. When printing an output is desirable, the beginning of the character information is aligned with the most significant digit position and the end of the numeral information is aligned with the least significant digit position of a printer.

BRIEF DESCRIPTION OF THE DRAWINGS

For a more complete understanding of the present invention and for further objects and advantages thereof, reference is now made to the following description taken in conjunction with the accompanying drawings showing an embodiment of the present invention, in which:

FIGS. 3(1), 3(2), and 3(3) schematically illustrate the manner in which information is loaded together with a label;

FIG. 4 schematically illustrates one example of key actuations in the present invention;

FIGS. 5(1), 5(2), and 5(3) schematically illustrate another example of key actuations in the present invention;

FIGS. 6(1) and 6(2) schematically illustrate still another example of key actuations in the present invention; and FIG. 7 schematically illustrates a further example of key actuations in the present invention.

DETAILED DESCRIPTION OF THE INVENTION

Figure 1:
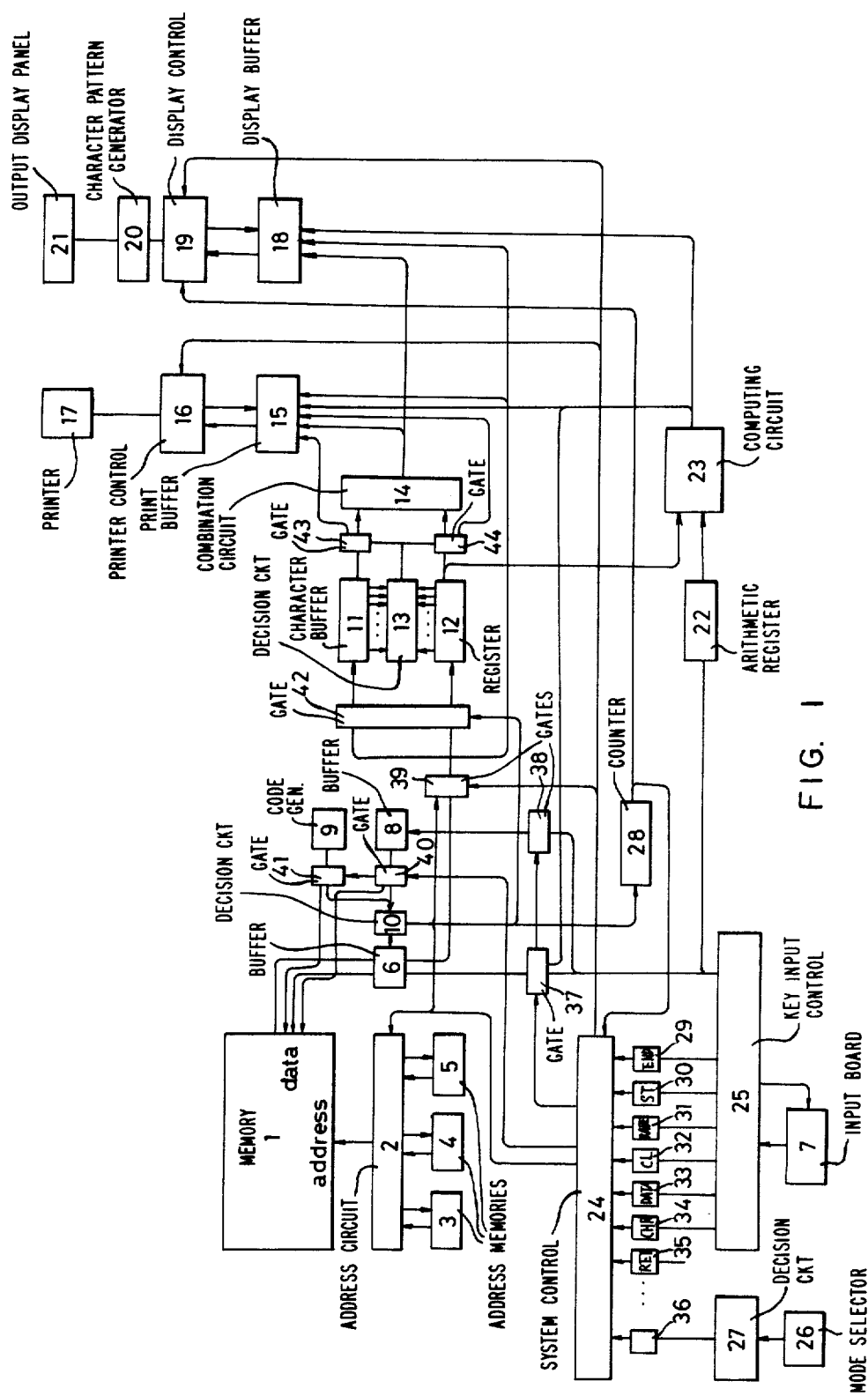
FIG. 1 is a block diagram of a principal circuit of an embodiment of the present invention.

FIG. 1 is a block diagram of a principal circuit for putting the present invention into practice. There is provided a memory 1 for storing character information, numeral data and so forth, an address circuit 2 for providing access to a desired address of the memory 1, a circuit 3 for storing the start address of a selected one of information blocks, a circuit 4 for storing a particular address (cursor address) of the selected information block, a working address circuit 5 for specifying a particular address of the memory 1, a first buffer circuit 6 for holding coded input information (character information or numeral information) introduced via the output of the memory 1 as specified by the address circuit 2 or an input board 7 and a second buffer circuit 8 for holding coded input information introduced via the input board 7 for comparison with the output of the first buffer circuit 6. A code generator 9 is adapted to generate any desired code. A decision circuit 10 senses if there is agreement between the outputs of the buffer circuits 8 and 9 and the output of the code generator 6. A character buffer circuit 11 holds the coded output of a lenght corresponding to the capacity of a printer or a display panel as derived from the memory 1. A data register 12 is adapted to hold a numeral section out of the output of the memory 1. A decision circuit 13 makes decision digit by digit as to whether the output of the buffer circuit 11 is in agreement with the counterpart of the data register 12. A combination circuit 14 receives the outputs of the character buffer 11 and the data register 12 and develops sequentially the logical sum thereof.

A print buffer 15 holds information to be printed and a printer control 16 receives the output of the buffer circuit 15 and controls operation of the printer 17. A display buffer circuit 18 holds information to be displayed and a display control 19 receives the output of the display buffer 18 and controls operation of an output display panel 21 via a character pattern generator 20.

There is further provided an arithmetic register 22 for holding the numeral information introduced via the keyboard and providing the same to a numeral information computing circuit 23 which receives the numeral information from the registers 22, 12, etc., executes a desired computation and provides the result of such a computation.

The memory device further includes a system control 24 and the keys 37 for introduction of alphabets, numerals or other characters.

A key input control 25 receives an output from a selected one of the keys 7, delivers its corresponding coded key output, senses the meaning of the key output and develops an output representative of its results. A selector 26 selects one of fixed modes. A decision circuit 27 receives the output of the switch 26 and supplies the result of its decision to the system control 24. A counter 28 executes counting in response to operation of the agreement circuit 10. A family of latch circuits 29, . . . 35, 36 receives the outputs of the key control 25 or the switch input decision circuit 27 and itself holds its condition. A family of gates 37–44 is governed by instructions from the system control 24, the agreement circuit 10 and the decision circuit 13.

Figure 2:
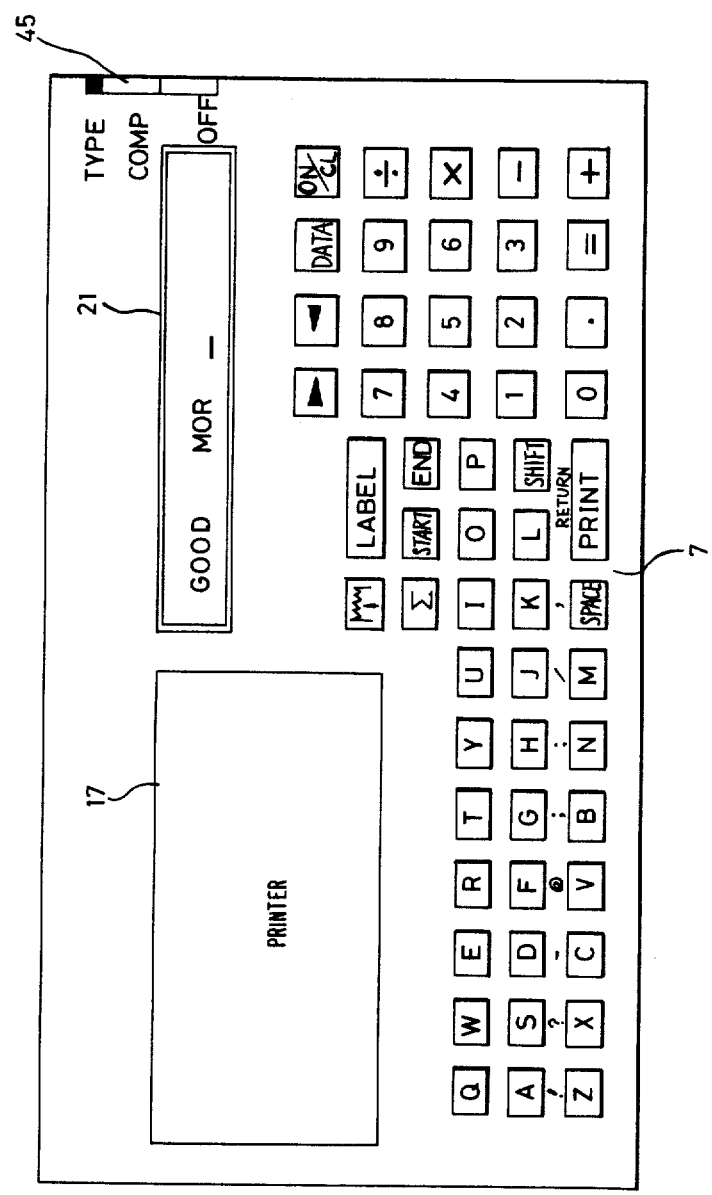
FIG. 2 is a plan view of the perspective of the illustrated embodiment.

FIG. 2 is a plan view showing the perspective of the illustrated embodiment which includes the key input board 7, the printer 17 and the display panel 21 as described above, in addition to a mode selector 45. The following Table 1 enumerates the titles of respective keys.

| KEY SYMBOL | KEY TITLE |
| --- | --- |
| A-Z | alphabet keys |
| 0-9,. | numeral keys |
| +,−,×,÷,= | function keys |
| ON/CL | on/clear key |
| LABEL | label key |
| START | loading start key |
| END | loading end key |
| SPACE | space key |
| PRINT | print key |
| DATA | numeral information entry key |
| ▲ | cursor up key |
| ◄ | cursor down key |
| Σ· | memory total key |

KEY ACTUATION

1. How to load character information and numeral information together into memory After actuation of the label (LABEL) key depress a desired character key (either an alphabet key or a numeral key) to set a label.

Depress the loading start (START) key.

Input a desired input (loading of character information).

Depress the numeral information entry (DATA) key (instruction for loading of numeral information)

Input numerals as numeral information (loading of numeral information)

Depress the loading end (END) key to complete loading.

2. How to fetch information

After depression of the LABEL key, actuate a selected label (character) key.

(a) At this time the character information appears on the display panel. Upon depression of the cursor up (▲) key the numeral information appears on the display panel. Upon the subsequent depression of the cursor down (◄) key the character information appears on the panel again. While the character information is being displayed, there is also on the display panel a given symbol indicating that the numeral information has been already loaded.

(b) In the case in which the display panel is of a considerably large capacity, both the character information and the numeral information as in the example (a) may be displayed at the same time.

3. How to print

Depress the print (PRINT) key under the condition of fetching as in 2. above.

4. How to accumulate the results of calculations

After depression of the memory total ( ) key, select a key indicative of the label (character) of a memory sought to be subject to accumulation.

MODES OF OPERATION

The manner by which information is loaded together with a label. FIG. 3(1) depicts information to be loaded, FIG. 3(2) depicts key actuations when the information is loaded and FIG. 3(3) depicts the contents of the memory 1 in which the information is loaded.

Upon actuation of the LABEL key the key input control 25 develops a desired code and supplies information indicative of the meaning of the actuated key to the system control 24. In the illustrated embodiment, the latch circuit 31 stores a signal indicating that the LABEL key is actuated and if a character (alphabets, numerals, etc.) corresponds to this label, then the corresponding information is fetched. For example, when the label "B" is selected, the system control 24 recognizes that the latch circuit 31 is in set position and the label "B" demands fetching the information, thus instructing retrieval of the contents of the memory 1 as requested by the label "B".

The following is the manner by which the address of the memory 1 is specified. The address of the memory 1 is selected by means of the address selection circuit 2 pursuant to the contents of the address memory circuits 3 through 5. One of the memory circuits 3-5 has the function of executing decisions, comparisons and setting in connection with the contents of the three memory address circuits under control of the system control 24. The address memory circuit 3 stores the starting address of a particular information block. The last memory address circuit 4 stores a particular address (cursor address) of a particular information block. The address circuit 5 stores any accessible address of the memory 1. Since the label is usually loaded as well as the LABEL code, retrieval is performed in sequence beginning with the leading address of the memory 1 for looking for the address where the LABEL code is present.

The following details the manner by which retriving is achieved. The retrieving used herein means searching the address of the memory 1 where the output of the memory 1 meets a certain condition (for example, agreement with a particular code). Selection of the address is helped with the address memory circuit 5. The address selector circuit 2 places the leading addres of the storage region subject to retrieving (for example, address "00" when retrieving is required throughout the memory 1). The device proceed with setting a particular condition. If agreement with a particular code is requested, then the particular code is placed into the second buffer circuit 8. Provided that it is a key code, this is established under control of the gate circuit 38. Furthermore, if agreement with another code is requested, then the code generator 9 develops such code. The circuit 2 places a particular address into the memory 1 of which output is then applied to the first buffer 6. The first buffer 6 holds the coded key input or serves as a buffer in applying inputs to the memory 1. Decision as to whether the particular condition is met is achieved by the decision circuit 10, with the result thereof being applied to the circuit 2, the gate circuits and the system control 24. Selection of the output of the code generator 9 and the output of the second buffer 8 is governed under the system control 24 and the gates 40 and 41. In the event that the output of the memory 1 (i.e., the contents of the first buffer 6) is monitored but not detected, the circuit 2 changes the content of the address memory circuit 5 into the next succeeding address. The above procedure is repeated until condition is satisfied. In this manner, retrieval is achieved for a variety of conditions, setting desired addresses.

To sense the block marked by the label "B", it is necessary that the LABEL code be sensed. The LABEL code is available from the code generator 9.

The character indicative of the label (in this case, "B") is established in the second buffer circuit 8. LABEL B is sensed in the following manner. When the LABEL code is sensed, the label itself is presented at the next succeeding address and the next lower address is established. The contents of the memory at that address is compared with the contents of the second buffer circuit 8. If both do not agree, the same procedure is repeated begining with the next succeeding address. If they disagree, the next address is aligned with the start of the information block. The contents of the label include all locations from the leading address through the END code resting at the end of that block. Merely establishing and loading the leading address in the address memory circuit 3 implies that retrieving the contents of the label B is completed.

All that is necessary to display the contents of the label B is to transfer the contents as defined by that addres through the address containing the END code to the display buffer 18 and output the same via the display panel 21. The character information and the numeral information are stored as seen from FIG. 3(3). In other words, the LABEL code, the label, characters, the DATA code, numerals and the END code are stored in the named order. While the character information and the numeral information are stored with the intervention of the DATA code, both are separately stored for displaying purposes. The character information is fed into the character buffer circuit 11 and the numeral information is fed into the data register 12. During monitoring, the output is serially transferred into the character buffer circuit 11 until the DATA code is reached and thereafter the contents following the DATA code ending with the END code is regarded as the numeral information and transferred into the data register 12. The output of the memory 1 is fed into the first buffer circuit 6 for comparison. It is already noted that the codes such as the DATA code and the END code are derived from the code generator 10. As a consequence, the two pieces of information are divided and selectively transferred into the character buffer circuit 11 or the data register 12 under control of gate circuits 39 or 42. It is obvious that the transferred information is characteristic of numerals corresponding to the label B. Since fetching is carried out in connection with the label B, the contents of the character buffer circuit 11 should be fed into the display buffer circuit 18 under control of a gate circuit 43 in order to display only the character information. By the operation of the display control 19, the contents of the display buffer circuit 18 are outputted through the code generator 20 and the display panel 21.

Assume now that a particular character (for example, "D") is assigned to the DATA code. For the character information on the display panel, the particular character pattern is displayed on the right extreme, indicating that any numeral is stored. As long as the DATA code is inputted, it is displayed in the form of a particular pattern.

Under the circumstance actuation of the ▬ key instructs the contents of the data register 12 to appear on the display panel. Display of the contents of the data register 12 is accomplished by transferring the contents of the data register 12 into the display control 18 under control of a gate 44. In this manner, it is possible to display the character (alphabets, numerals, etc.) information and the numeral information separately from each other.

When printing these contents is desirable, they are transferred into the print buffer circuit 15 in the same manner as stated previously. To print the character information and the numeral information separately, the same procedure as described with regard to the display method is followed; the contents of the character buffer circuit 11 are first fed into the print buffer circuit 15 for printing purposes and then the contents of the data register 12 are transferred thereto.

By conducting the following procedure for the contents of the character buffer circuit 11 and the data register 12, it becomes possible to print a line of information at one time (that is, both the character information and the numeral information are printed in a line). At this time the character information is justified at the extreme left and the numeral information at the extreme right with a blanking space of N digits. The corresponding digit outputs of the character buffer circuit 11 (the character information stored therein is justified at the extreme left) and the data registers (the numeral information is justified at the extreme right) are fed to the decision circuit 13 which in turn produces its logic sum. If "0" or a blank is sensed at a central portion N, then the result of such decision is supplied to the gate circuits 43 and 44. Accordingly, the outputs of the character buffer circuit 11 and the data register 12 are supplied to the combination circuit 14. The combination circuit 14 may be merely an OR gate. The output of the combination circuit 14 is transferred into the print buffer circuit 15 to complete printing in the same manner as described previously.

When it is desired to display both the character information and the numeral information at the same time, all that is necessary is to transfer the output of the combination circuit 14 into the display buffer circuit 18.

After fetching is completed, the numeral information is introduced and held in the data register 12. On the other hand, conventional key inputs are serially introduced and held in the arithmetic register 12. The outputs of these registers are supplied to the numeral information computing circuit 23 for execution of arithmetic operations which are under control of functional information introduced via the keyboard. The results of the arithmetic operations may be fed to the print buffer circuit 15 and the display buffer 18 for printing and displaying purposes.

It is clear that the above illustrated embodiment is adapted to accumulate or add the results of the operations to the numeral information contained in the memory 1. In other words, when the result of a particular operation is available, it can be accumulated through the following procedure. Subsequent to actuation of the v key a character corresponding to the label is introduced. As in the case of actuations of the LABEL key and the label specifying character key the apparatus proceeds with retrieving within the memory 1. An output value originating from such retrieving is fed to the data register 12. Since the leading address of the information block in the memory 1 is stored in the address memory circuit 3 after retrieving, it is evident that a storage region of interest is related with the numeral information after the DATA code is sensed. The numeral information computing circuit 23 executes an arithmetic operation on a selected one of the information blocks and the result of a particular operation and provides the result of such an operation for the memory 1 by way of the first buffer circuit 6 under control of the gate circuit 37.

The following will set forth how to load a new content to a label C. If the C key is actuated after the LABEL key, then the apparatus proceeds with retrieving the label C in the same manner as described previously. At this time the apparatus operate to sense the blank code (a code which shows that none of the information is stored) as well as retrieving the label C in the same manner as described previously. In the case in which the label C is retrieved in the example of FIG. 3, the blank code is present at address "32". This code so sensed indicates the absence of the label C. When loading is about to start in connection with this label (that is, the START key is actuated), the working address is equal to the address corresponding to the LABEL code and is loaded into the address memory circuit 4. Also, "C" corresponding to the label is loaded into the first buffer circuit 6.

Upon actuation of the START key the LABEL code is loaded into the address as specified by the address memory circuit 4 and the count of the address memory circuit 4 is incremented by "1" by means of the address control 2. Thereafter, the label "C" is tranferred from the first buffer circuit 6 into the memory 1. Furthermore, the circuit 2 increments the address memory circuit 4 by one. This address indicates the leading address for information to be introduced and is set and stored in the address memory circuit 3. The apparatus is therefore ready for loading. The succeeding character inputs are all regarded as information and supplied in the form of encoded key inputs to the first buffer circuit 6 and to the memory 1. Each time an input is introduced to the memory 1 the count of the address memory circuit 4 is incremented by one to set the next address for a next input. Since the count of the address memory circuit 3 remains unchanged, the label C is still maintained. After the introduction of information loading is completed upon actuation of the END key.

To make amendment of the input information possible, the cursor must be movable anywhere in an information block being currently introduced. The cursor may be moved up by the cursor ► key and moved down by the ◄ key. While the cursor is moved up, the system decides whether the output of the memory 1 relates to the blank code and the address associated with the blank code is then prevented from being incremented. The procedure of moving down the cursor, on other hand, is regarded as void after the count of the address memory circuit 4 is in agreement with the leading address memory circuit 3. Such agreement is monitored by deciding via the decision circuit 10 whether the output of the first buffer circuit 6 is in agreement with that of the code generator 9. This makes sure that the blank code is aligned with the last address of the information block.

By the END key the count of the leading address memory circuit 3 is sent to the cursor address memory circuit 4. While the output is serially monitored, it is decided where the blank code is located. The END code is stored at that address, thus completing the input procedure. The same procedure may be expected upon actuation of a key other than the END key, for example, the ON/CLEAR key. In other words, the loading procedure may be completed by any key other than the END key. In this case the END code is supplied from the code generator 9 to the memory 1.

Although loading is carried out substantially so as to introduce the character information, the DATA code and the numeral information in the named order, the character information, if necessary, can be omitted. In this case, loading is effected beginning with actuation of the DATA key. Since the information block is loaded as well as assignment of an individual label, the label serves merely as comment information. During fetching the contents of the character buffer circuit 11 become merely blank in separating the character information and the numeral information in response to the DATA code.

In the event that any amendment is made to replace the contents being currently loaded as DATA by other codes (that is, the DATA code is replaced with a different code), next inputs are not processed as the numeral information even though they are introduced as the numeral information. For this reason, the succeeding numeral information is erased after the DATA code is replaced with the different code. Erasure is achieved in the following manner. The contents of memory 1 are outputted and unloaded into the first buffer circuit 6. When the contents are the DATA code, the cursor address memory circuit 4 (indicating the position of the DATA code) is transferred into the working address circuit 5. The blank code is loaded into the following addresses. This procedure ends when the blank code proceeds with the address where loading is already completed. Thereafter, a code indicative of a newly introduced key input is loaded into the address as specified by the count of the working address circuit 5. This completes changing the DATA code and erasing the numeral information.

While the DATA key behaves as the numeral information specifying key as stated previously, actuation of the DATA key during the introduction of numeral information in the TYPE (print) mode allows the previous numeral information to be erased. For example, when actuation of the DATA key follows key actuations of "LABEL, A, T, O, T, A, L, DATA, 1, 2, 3, 4", the previously introduced numeral information "1234" is cleared. In other words, the DATA key serves both as the numeral information specifying key and the numeral information clearing key. During the COMP (computation) mode the DATA key serves as a conventional clear entry key.

FIGS. 4 though 7 depict an example of key actuations, an example of a visual display and an example of printing. In these drawings, the LABEL key is identified by LA, the START key by ST, the DATA key by DT, the END key by ED, and the SHIFT key by SH.

Referring to FIG. 5(1), should "EL-1190, 154.95 (sales price)" be loaded together with the label H and "83.55 (discount rate)" be loaded together with the label D, these input values can be of use as constants for subsequent calculation. FIG. 5(2) depicts key actuations during loading of information and FIG. 5(3) depicts an example of a printout on a journal in the example of FIG. 5(1).

FIG. 6(1) shows the case where "DE-6850 89.50" with the label T, "EF-6806 149.50 with the label Y, "HN-5532 49.95" with the label U and "SALES =0." with the label S are loaded and respective information blocks as specified by the labels T, Y and U are used as constants for calculation. A total thereof is evaluated into the numeral information section of the information block as specified by the label S. FIG. 6(2) shows an example of printing as in the example of FIG. 6(1).

In an example of FIG. 7, provided that "10-10-81 (date)" with the label D, "TAX 0.1 (tax rate)" with the label T are loaded, the information block as specified by the label D is used as a data memory and that as specified by the label T is used as a constant memory.

The invention being thus described, it will be obvious that the same may be varied in many ways. Such variations are not to be regarded as a departure from the spirit and scope of the invention, and all such modifications are intended to be included within the scope of the following claims.

What is claimed is:

1. An electronic hand-held memory device comprising:

input means for introducing sets of character information data and corresponding numerical data and corresponding numerical information data into said device, said input means further introducing control information and label codes each representative of the leading address of a particular information and corresponding numerical information data into said device;

memory means responsive to said input means for storing a plurality of sets of character information data and corresponding numerical information data together at address locations therein, said memory means further storing a label code corresponding to each said set at different of said address locations;

output display means, responsive to said control information introduced by said input means, for accessing desired address locations represented by selected label codes within said memory means for recalling said character information and/or numerical information stored with each label code, and for providing a display of said information to a user, said output display means aligning the beginning of said character information with the most significant digit position of each display position and aligning the end of the numeral information with the least significant digit position of each said display position; and computing means, responsive to said control information, label codes corresponding to desired information and numerical information data introduced by said input means, for accessing each address location corresponding to said label codes and corresponding to desired information and summing together the numerical information data stored in association therewith to form summation information representative of the sum of said numerical information;

said output display means further being responsive to said computing means for providing said summation information to the user.

2. The device of claim 1 wherein said character and-/or numerical output means includes a printer for providing said information to the user, when desired.

3. The device of claim 2 wherein said output display means includes an alphanumeric display panel.

* * * * *